J. J. YAGER.
COMPRESSED GAS HEATER.
APPLICATION FILED FEB. 2, 1915.
1,162,537.
Patented Nov. 30, 1915.
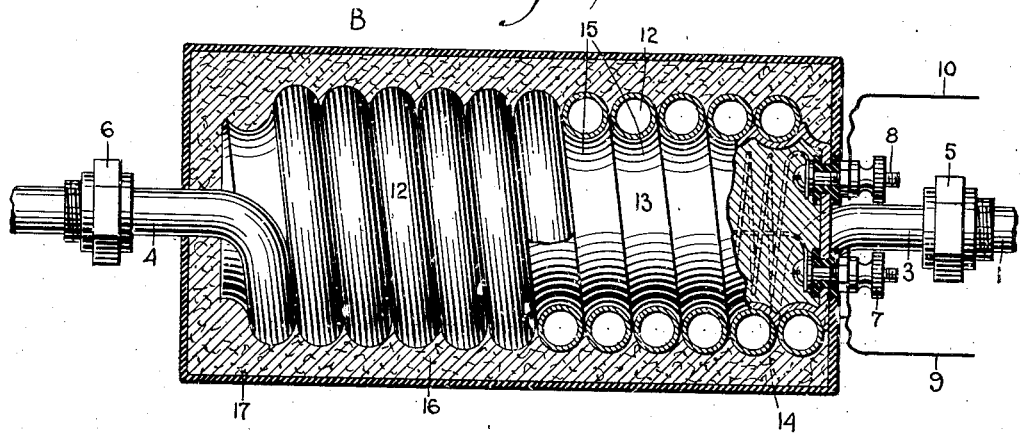
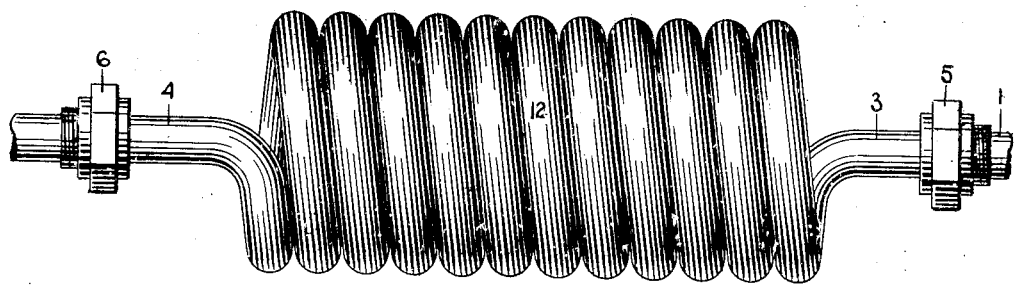
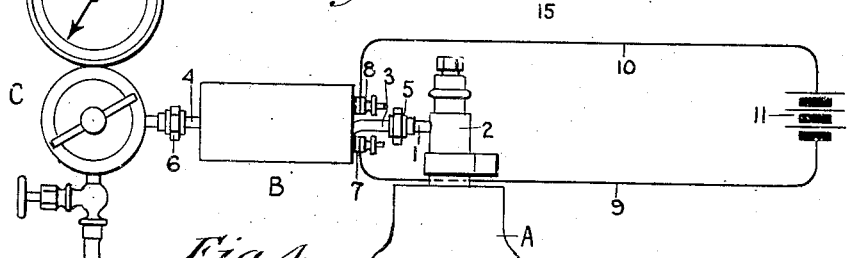
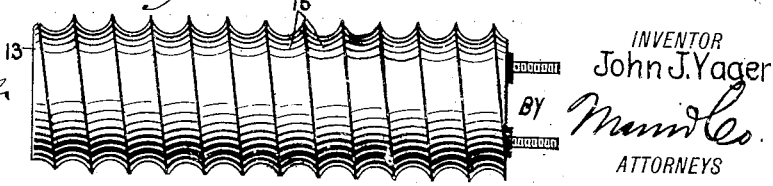
WITNESSES
Edw. Thorpe
C. Bradway
INVENTOR
John J. Yager
BY Munn Co.
ATTORNEYS

UNITED STATES PATENT OFFICE.

JOHN JOSEPH YAGER, OF SHERIDAN, WYOMING.

COMPRESSED-GAS HEATER.

1,162,537.   Specification of Letters Patent.   Patented Nov. 30, 1915.

Application filed February 2, 1915. Serial No. 5,650.

*To all whom it may concern:*

Be it known that I, JOHN J. YAGER, a citizen of the United States, and a resident of Sheridan, in the county of Sheridan and State of Wyoming, have invented a new and Improved Compressed-Gas Heater, of which the following is a full, clear, and exact description.

This invention relates to an electric heater for use in connection with carbonating apparatus for preventing freezing at the regulator or expansion valve, which is a well-known difficulty in apparatus for bottling soft drinks and charging soda water fountains with gas under compression.

The invention has for its general objects to provide a heater of novel, simple and inexpensive design for use between the drum that holds the carbonic acid gas and the regulator or pressure-reducing valve, whereby the gas in flowing from the drum to the valve will be heated to such a temperature that there will be no danger of freezing or clogging up of the regulator.

A further object of the invention is the provision of a heating device which includes an electrically heated core having a helical groove in its surface in which groove is wound a helical metal tube in which gas under great pressure is heated in transit to the regulator or reducing valve, the convolutions of the heating coil being inclosed in a suitable insulating jacket, and the whole device is of such size that it can be attached to the outlet nipple of the drum and be supported thereby, with the regulator supported by the heater.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a sectional view of the heater; Fig. 2 is a plan view of the heating coil; Fig. 3 is a side view of the upper part of a gas drum with the electric heater and pressure regulator applied thereto; and Fig. 4 is a plan view of the electric heating element or core drawn on a reduced scale.

Referring to the drawing, A designates a drum which contains carbonic acid or other gas under the usual pressure, and connected with the nipple 1 of the valve 2 is an electric heater B, which in turn is connected with the pressure regulator or expansion valve C, which latter is of usual form. The heater B includes a suitable conduit, the ends 3 and 4 of which are connected respectively with the drum A and regulator C, whereby the heater is supported on the drum and the regulator on the heater. The heater B is so designed that it can be used in connection with a gas drum and regulator of usual design without requiring any changes, and to insert the heater it is merely necessary to break the usual joint between the regulator and drum and interpose the heater and secure the same in place by couplings 5 and 6 on the extremities 3 and 4 of the heater. This heater serves to raise the temperature of the gas as it flows out to the carbonating apparatus, and therefore, there is no danger of ice forming at the regulator and interfering with the operation. The heater B has binding posts or terminals 7 and 8 which are connected by wires 9 and 10, respectively, with a suitable source of current 11.

The electric heater B is constructed as shown in Figs. 1 and 2 of a metal pipe 12 bent into a helical coil of uniform diameter and with its adjacent convolutions in contact or close proximity to each other, and the source of heat is disposed within the coil. This source of heat comprises a core 13 of any suitable heat-conducting material in which is a resistance element or wire 14 through which electric current passes and heats the core 13, the ends of the wire 14 being connected with the binding posts 7 and 8. The circumferential surface of the core 13 is provided with a helical groove 15 of the same pitch as the helical coil of the pipe 12, and this core is inserted in the pipe by relative rotation of the core and coil, whereby the core screws into the coil. By grooving the core the area of contact of the convolutions of the pipe coil with the core is greatly increased and a maximum heating capacity within a comparatively small space is obtainable. The coil of the pipe 12 is incased in asbestos or other heat non-conducting lagging 16, so that escape of heat is prevented, and this lagging may be arranged within a metal shell 17, from the ends of which the extremities 3 and 4 of the heating coil project. This arrangement provides a strong and durable heater and one which takes up comparatively little space.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A compressed gas heater comprising a heating core having a helical groove on its circumferential surface, a helical coil surrounding the core and having its convolutions lying in the groove of the core, the ends of the coil being open, whereby the core is screwed into the coil.

2. A compressed gas heater comprising a heating core having a helical groove on its circumferential surface, a helical coil surrounding the core and having its convolutions lying in the groove of the core, the ends of the coil being open whereby the core is screwed into the coil, and a non-conductor casing surrounding the coil and core whereby the same are held together and whereby radiation of heat is prevented.

3. A compressed gas heater comprising a heating core having a helical groove on its circumferential surface, a helical coil surrounding the core and having its convolutions lying in the groove of the core, the ends of the coil being open whereby the core is screwed into the coil, a non-conductor casing surrounding the coil and core whereby the same are held together and whereby radiation of heat is prevented, the ends of the coil extending out of the ends of the casing, and connections for said heating core extending through one end of the casing.

In testimony whereof I have signed my name to this specification in the presence of two subscribing witnesses.

JOHN JOSEPH YAGER.

Witnesses:
  B. G. McKEEN,
  J. D. THOM.